United States Patent [19]

Matsumoto et al.

[11] Patent Number: 5,108,491
[45] Date of Patent: Apr. 28, 1992

[54] ROLLING BEARING COMPOSITION

[75] Inventors: Yoichi Matsumoto, Yokohama; Kousuke Nonaka, Fujisawa, both of Japan

[73] Assignee: Nippon Seiko Kabushiki Kaisha, Tokyo, Japan

[21] Appl. No.: 706,877

[22] Filed: May 29, 1991

[30] Foreign Application Priority Data

Jun. 4, 1990 [JP] Japan .................. 2-146742

[51] Int. Cl.⁵ .............................. C22C 29/02
[52] U.S. Cl. ......................... 75/242; 75/243; 419/67; 419/68
[58] Field of Search ............... 75/243, 242; 419/67, 419/68

[56] References Cited

U.S. PATENT DOCUMENTS

| | | | |
|---|---|---|---|
| 3,802,852 | 4/1974 | Niimi et al. | 75/243 |
| 4,388,114 | 6/1983 | Suganuma et al. | 75/243 |
| 4,420,543 | 12/1983 | Kondo et al. | 75/252 |
| 4,601,592 | 7/1986 | Jatczak | 384/564 |
| 4,702,767 | 10/1987 | Takata et al. | 75/512 |

Primary Examiner—Stephen J. Lechert, Jr.
Attorney, Agent, or Firm—Frishauf, Holtz, Goodman & Woodward

[57] ABSTRACT

A rolling bearing comprise a bearing ring having inner and outer rings, and rolling elements. At least one of the inner and outer rings and the rolling elements is formed of a sintered alloy steel and has pores and carbides present therein. The largest one of the pores has a diameter equal to or smaller than 3 μm in terms of a diameter assued if the largest pore were converted to a spherical shape. The largest one of the carbides has a diameter equal to or smaller than 12 μm in terms of a diameter assumed if the largest carbide were converted to a spherical shape. The at least one of the inner and outer rings and the rolling elements has hardness higher than 64 and lower than 69 in terms of HRC.

6 Claims, 9 Drawing Sheets

ROLLING BEARING COMPOSITION

BACKGROUND OF THE INVENTION

This invention relates to rolling bearings for use in automotive vehicles, agricultural machinery, construction equipment, machinery for use in the iron and steel industry, etc., and more particularly to rolling bearings of this kind which are required to have long service lives.

Conventionally, there have been used various alloy steels, such as Bearing steel Class No. 2 (SUJ 2), for this kind of rolling bearing. However, recently, rolling bearings of this kind are often used under conditions in which higher pressure is applied to the bearings, as heavier loads are applied thereto and/or the size of same is reduced with enhancement in the performance of machinery using the rolling bearings. Accordingly, there is an increasing demand for rolling bearings having higher durability and hence prolonged lives.

In an attempt to prolong the lives of rolling bearings of this kind, it has been employed to optimize the concentration of retained austenite in the raceway surface or the rolling contact surface of the rolling element, and reduce the non-metallic inclusion. These measures have somewhat contributed to prolonging the lives of the rolling bearings. However, they are not sufficient to fully meet the above-mentioned recent demand for bearings having prolonged lives.

To enhance the hardness of component parts, which are formed of steel, of a rolling bearing is one possible way to improve the fatigue resistance of the rolling bearing for the purpose of prolonging the life of same. However, to enhance the hardness of the steel, carbide-forming elements, such as Mo, W, and V, have to be added in large quantities, as is the case with high speed tool steels. This results in crystallization of large carbides upon solidification, from which fatigue is liable to start to occur. Therefore, this method cannot necessarily attain the desired prolongation of the lives of the rolling bearings.

Under these circumstances, methods have recently been proposed e.g. by Japanese Provisional Patent Publications (Kokai) Nos. 61-19756 and 60-67644, which comprise preparing a fine powder of component elements for a high speed steel by the atomizing method, and then sintering and rolling same, without using the conventional casting method, as in the case of sintered high speed steel, to thereby obtain a very hard steel containing no large carbides. According to the method proposed by Japanese Provisional Patent Publication (Kokai) No. 61-19756, a powder of a carbide of a carbide-forming element selected from the group consisting of Cr, Mo, W, and V is mixed with a powder of soft iron (Fe) and carbon, and the resulting mixed powder is sintered to form a sintered high speed steel. According to the method proposed by Japanese Provisional Patent Publication (Kokai) No. 60-67644, a powder of an alloy is evenly mixed with particles (non-reactive particles) which do not react with the matrix phase metal during sintering and heat treatment, then the resulting mixed powder is sintered, and then the resulting sintered mixture is sintered together with particles (reactive particles) which precipitate during heat treatment to form a sintered high speed steel.

Sintered high speed steels produced by the proposed methods contain very small crystallized carbides, by precipitation and solidification of steel without forming large carbides, and hence are very hard and hence excellent in wear resistance. However, these methods do not take into consideration the upper limits of the size of pores formed in the steel and the size of carbides, the optimum range of hardness, etc. The mere use of the very hard sintered high speed steels to form rolling bearings without taking these factors into consideration cannot attain desired prolongation of the lives of the rolling bearings.

SUMMARY OF THE INVENTION

It is the object of the invention to provide a rolling bearing which has a prolonged rolling contact fatigue life, by delimiting of the upper limits of the sizes of pores and carbides formed in a sintered alloy steel forming the rolling bearing, the optimum range of hardness of same, etc.

To attain the above object, the present invention provides a rolling bearing comprising inner and outer rings, and rolling elements, at least one of the inner and outer rings and the rolling elements being formed of a sintered alloy steel, the at least one of the inner and outer rings and the rolling elements having pores and carbides present therein, the largest one the pores having a diameter equal to or smaller than 3 μm in terms of a diameter assumed if said largest pore were converted to a spherical shape is the largest one of the carbides having a diameter equal to or smaller than 12 μm in terms of diameter assumed if said largest carbide were converted to a spherical shape into a complete round, the at least one of the inner and outer rings and the rolling elements having hardness higher than 64 and lower than 69 in terms of HRC.

Preferably, the rolling elements have hardness higher than that of the inner and outer rings.

More preferably, the sintered alloy steel is manufactured by rolling a sintered body by a reduction ratio of not smaller than 7.

Also preferably, the sintered alloy steel is manufactured from an alloy powder by a cold isostatic pressing (CIP)+hot extrusion method.

The above and other objects, features, and advantages of the invention will become more apparent from the ensuing detailed description taken in conjunction with the accompanying drawings.

DETAILED DESCRIPTION

The present inventors have made studies in order to solve the above-described problem, and as a result reached the finding that the rolling contact fatigue life (hereinafter simply referred to as "life") of a rolling bearing formed of a sintered alloy steel depends on the sizes of pores and carbides in the rolling bearing, as well as the hardness of same, and becomes maximum when these factors are in respective predetermined ranges.

More specifically, a rolling bearing comprising bearing rings i.e. inner and outer rings, and rolling elements, at least one of the inner and outer rings, and the rolling elements being formed of a sintered alloy steel, has a very long life, if the diameter of the largest pore in terms of a diameter assumed if the largest pore were converted to a spherical shape (hereinafter merely referred to as "diameter(s) of the largest pore(s)" unless otherwise specified), is equal to or smaller than 3 μm, the diameter of the largest carbide in terms of a diameter assumed if the largest carbide were converted to a spherical shape (hereinafter merely referred to as "diameter(s) of the largest carbide(s)" unless otherwise specified), is equal to or smaller than 12 μm, and the hardness is higher than 64 in terms of HRC and lower than 69 in terms of same.

Further, it has been found that the rolling bearing has a longer life if the rolling elements have hardness higher than that of the bearing rings.

Also, it has been found that the sintered alloy steel has a satisfactorily reduced number of pores if it is made by rolling the sintered body by a reduction ratio of 7 or more.

Figure 9:
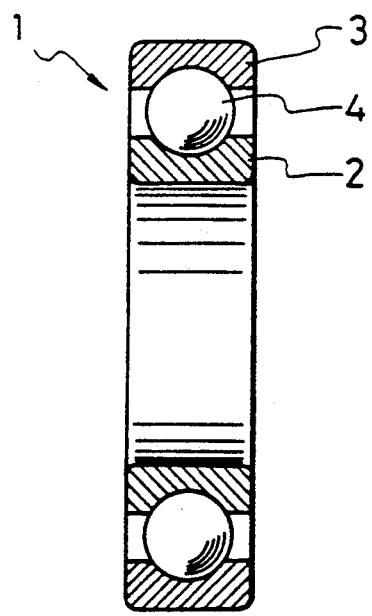
FIG. 9 is a cross-sectional view showing an example of a rolling bearing.

The present invention is based on the above findings. The invention will now be described in detail. FIG. 9 shows an example of a rolling bearing 1 which comprises bearing rings i.e. an inner ring 2 and an outer ring 3, and a plurality of balls 4 as rolling elements. At least one of the inner and outer rings 2, 3 and the ball 4 is formed of a sintered alloy steel. The reasons for delimiting the sizes of pores and carbides, the relationship between hardness of the rolling elements and that of the bearing rings, and the reduction ratio, as described above, will be explained in the following:

(a) Size of pores: equal to or smaller than 3 μm in diameter

When the bearing ring and the rolling element are in rolling contact with each other, shear stress occurs under respective surfaces of same. If the rolling contact is repeated, a crack may be formed in the bearing ring or the rolling element, which may further develop and finally result in flaking. In this process, a pore is most liable to form the starting point of the crack. Therefore, a pore can be regarded as a preliminary crack, and the speed of development of the crack is proportional to the size of the pore. Therefore, as larger pores exist, the rolling contact fatigue strength becomes smaller. If the pores have diameters equal to or smaller than 3 μm, the speed of development of the resulting cracks is very slow, and hence, in actuality, such pores cannot form the starting points of cracks.

(b) Size of carbides: equal to or smaller than 12 μm in diameter

Carbides can form the starting points of cracks due to rolling contact fatigue. A carbide is not so harmful as a pore, but can also be regarded as a preliminary crack. As larger carbides exist, the rolling contact fatigue strength becomes smaller. If the carbides have diameters equal to or smaller than 12 μm, the speed of development of the resulting cracks is very slow, and hence, in actuality, such carbides cannot form the starting points of cracks.

(c) Hardness: higher than 64 and lower than 69 in terms of HRC

Since large bearing pressure is repeatedly locally applied to the raceway surface and rolling contact surface of the rolling element, enhancement of the hardness of the surfaces is effective in improving the rolling contact fatigue strength of a rolling bearing. As the hardness of sintered alloy steel forming the rolling bearing increases until 64 in terms of HRC, the rolling contact fatigue strength of the rolling bearing proportionally increases, but when the hardness goes beyond 64 in terms of HRC, cracks can be more easily developed from even very small defects or pores so that the rolling contact fatigue strength is not improved even if the hardness further increases. Further, if the hardness is higher than 69 in terms of HRC, the rolling contact fatigue strength rather decreases. For this reason, the above hardness range has been determined.

(d) Hardness of the rolling elements: higher than that of the bearing rings

To improve the rolling contact fatigue strength, it is required to delimit the sizes of pores and carbides, and the hardness range, as described above. However, to prolong the life of a rolling bearing, it is also important to set the relationship in hardness between the rolling elements and the bearing rings such that the former are harder than the latter. This is based upon the following ground: In a rolling bearing, flaking normally occurs mainly in inner and outer rings. However, if the hardness of the rolling elements is lower than that of the bearing rings, flaking occurs convergently in the rolling elements at an early stage of use, and hence the life of the rolling bearing becomes short. For this reason, the above condition has been determined.

(e) Reduction ratio from the sintered body: equal to or larger than 7

The reduction of the number and size of pores aimed by the present invention is effectively achieved by increasing the reduction ratio at which the sintered body is reduced to the desired shape, and hence the ratio of reduction of the cross-sectional area by rolling or extrusion. However, if the reduction ratio is higher than 7, a further increase in the reduction ratio no longer contributes to the reduction of the number and size of pores. Therefore, the reduction ratio has been determined as above.

(f) A sintered alloy steel according to the invention can be manufactured by a CIP (cold isostatic pressing)+hot extrusion method. To attain the reduction of the number and sizes of pores, it is necessary to shorten a time period over which the steel powder is held at high temperatures and under high pressure. The CIP+-hot extrusion method is more effective in attaining the reduction of the number and sizes of pores than an HIP (hot isostatic pressing) method, since the former requires a shorter time period over which the steel powder is held at high temperatures and under high pressure than the latter.

Examples of the rolling bearing according to the invention will now be described in detail.

EXAMPLE 1

High speed tool steel powders for forming Specimens Nos. 1 to 11 corresponding to SKH 54 and having chemical compositions as shown in Table 1 were prepared by the gas-atomizing method. This method comprises the steps of melting a steel in a vacuum induction furnace, transferring the molten steel into a tundish, causing the molten steel to flow from a nozzle at the bottom of the tundish, and blowing a nitrogen gas under high pressure to the molten steel flowing from the nozzle, to thereby prepare a fine powder each grain of which is spherical. The concentration of oxygen in the blown nitrogen gas was varied between the steels as shown in Table 1. The high speed tool steel powders were each sintered by two different methods: an HIP (hot isostatic pressing) method and a CIP (cold isostatic pressing)+hot extrusion method. According to the HIP method, a powder obtained by sieving each of the starting powders to grain sizes equal to or smaller than 80 mesh (177 μm) was charged into a capsule made of soft steel. The capsule was welded with a cap having a degassing pipe. Then, the capsule was heated up to 1150° C. while being evacuated via the degassing pipe by a rotary pump, and held under this condition for six hours. Then, the vacuum relief valve was closed, and the degassing pipe was squashed to be airtightly blocked up and then cut off, followed by being sealed by TIG welding. The resulting capsule was subjected to HIP treatment at a temperature of 1100° C. under pressure of 1500 kgf/cm$^2$ for two hours. After the HIP treatment the resulting steel ingot was rolled by a reduction ratio of approx. 10 into a steel bar having a diameter of 65 mm. On the other hand, according to the CIP+hot extrusion method, a powder obtained by sieving each of the starting powders to grain sizes equal to or smaller than 80 mesh was charged into a capsule made of low carbon steel. The capsule was welded with a cap having a degassing pipe. Then, the capsule was heated up to 1150° C. while being evacuated via a rotary pump, and held under this condition for six hours. Then, the vacuum relief valve was closed, and the degassing pipe was squashed to be airtightly blocked up, and then cut off, followed by being sealed by TIG welding. The resulting capsule was subjected to CIP treatment at a temperature of 30° C. under pressure of 5000 kgf/cm$^2$ for 10 minutes. The resulting green compact was heated up to 1100° C. and held under this condition for 10 minutes, and then subjected to hot extrusion into a steel bar having a diameter of 65 mm. The ratio of cross-sectional area of the green compact before hot extrusion and that after extrusion was approx. 10 to 1.

Figure 1:
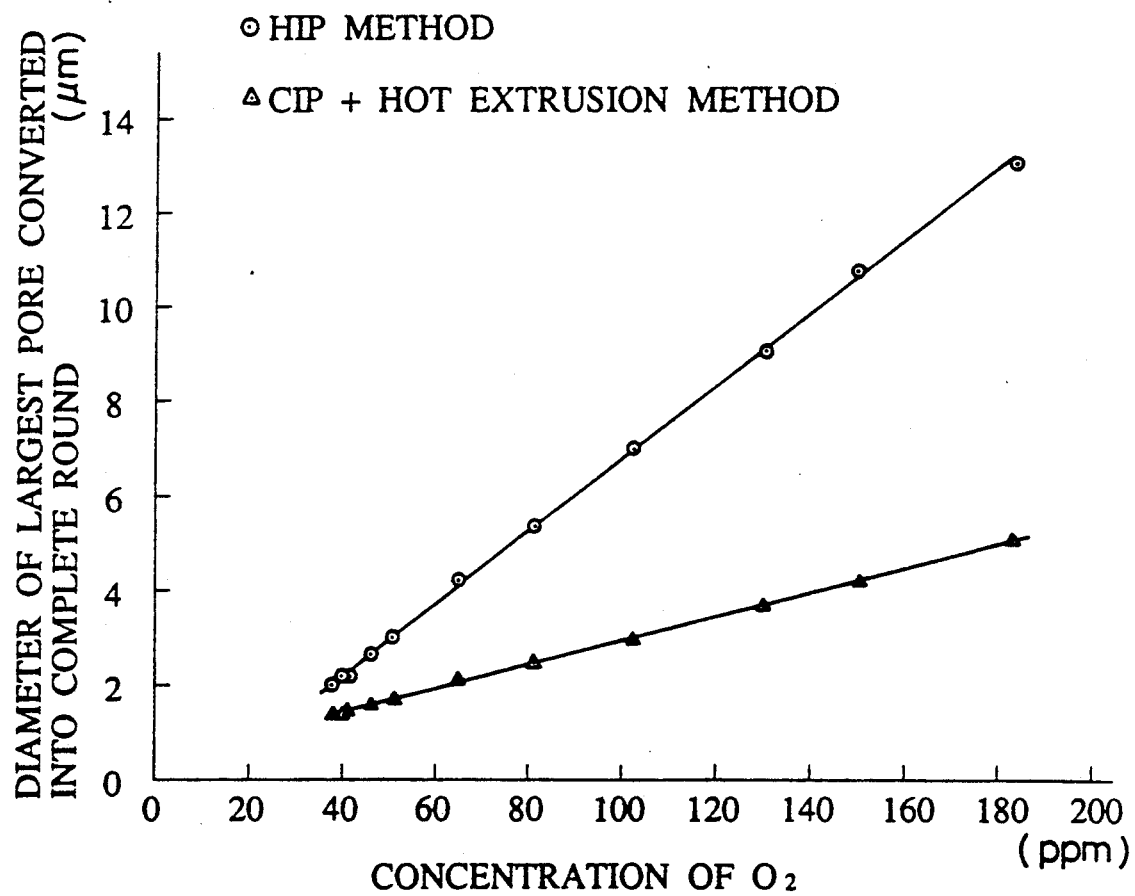
FIG. 1 is a view showing the relationships, which depend on sintering methods, between the diameters of the largest pores in terms of diameters assumed if the largest pores were converted to spherical shapes (hereinafter merely referred to as "diameter(s) of the largest pore(s)" unless otherwise specified), in steel bars obtained in Example 1, and oxygen concentration in steel powders as starting materials in same.

Each sintered steel bar was cut into two pieces along an axis thereof and in parallel with the direction of rolling. After polishing the cut surfaces of the resulting bar, the sizes and number of pores in the cut surfaces was examined by a microscope. The cut surface area subjected to examination was 3600 mm$_2$. Table 1 shows diameters of the largest pores which exist in the steel bars of Specimens Nos. 1 to 11 produced by the HIP method and the CIP+hot extrusion method, while FIG. 1 shows the relationships, which depend on the sintering methods, between the diameters of the largest pores in steel bars obtained, and oxygen concentration in steel powders as starting materials. It will be learned that the diameter of each largest pore becomes smaller as the oxygen concentration in the steel powder as its starting material decreases, in both the sintering methods. However, it should be noted that at the same oxygen concentration, the diameter of the largest pore in a steel bar produced by the CIP+hot extrusion method is smaller than that of the largest pore in a steel bar produced by the HIP method. According to the present inventor's studies, pores are produced due to the fact that iron oxide existing on the surface of a steel grain reacts with carbon in the steel grain during the HIP treatment or the hot extrusion to generate a gas of carbon oxide (CO), which cannot be evaporated out of the bulk. The reason why at the same concentration of oxygen present in a steel powder, the diameter of the largest pore in a steel bar produced by the CIP+hot extrusion method is smaller. is that the duration of treatment under high temperature and high pressure is shorter in the case of this method, and hence decomposition of iron oxide occurs at a less rate.

TABLE 1

| SPECIMEN NO. | CHEMICAL COMPOSITION (%) | | | | | | | | | CONCENTRATION OF O$_2$ IN N$_2$ GAS (ppm) | DIAMETER OF LARGEST POLE CONVERTED INTO COMPLETE ROUND (μm) | |
|---|---|---|---|---|---|---|---|---|---|---|---|---|
| | C | Si | Mn | P | S | Cr | Mo | W | V | O (ppm) | HIP METHOD | CIP + HOT EXTRUSION METHOD |
| 1 | 1.32 | 0.23 | 0.28 | 0.019 | 0.004 | 3.84 | 4.79 | 5.81 | 4.12 | 183 | 104.7 | 13.0 | 5.1 |
| 2 | 1.27 | 0.24 | 0.25 | 0.018 | 0.003 | 4.04 | 4.74 | 5.66 | 4.19 | 150 | 41.7 | 10.8 | 4.2 |
| 3 | 1.29 | 0.22 | 0.24 | 0.17 | 0.003 | 3.96 | 4.81 | 5.70 | 4.26 | 130 | 21.9 | 9.1 | 3.7 |
| 4 | 1.36 | 0.27 | 0.26 | 0.21 | 0.004 | 3.88 | 4.86 | 5.71 | 4.01 | 102 | 10.0 | 7.0 | 3.0 |
| 5 | 1.33 | 0.25 | 0.31 | 0.20 | 0.006 | 3.94 | 4.91 | 5.69 | 4.27 | 81 | 5.0 | 5.3 | 2.5 |
| 6 | 1.29 | 0.24 | 0.30 | 0.015 | 0.005 | 4.10 | 4.88 | 5.84 | 4.20 | 64 | 3.0 | 4.2 | 2.1 |
| 9 | 1.28 | 0.24 | 0.30 | 0.022 | 0.002 | 4.01 | 4.75 | 5.80 | 4.15 | 40 | 1.0 | 2.2 | 1.5 |
| 11 | 1.32 | 0.25 | 0.29 | 0.018 | 0.003 | 3.93 | 4.96 | 5.76 | 4.16 | 37 | 0.3 | 2.0 | 1.4 |
| 7 | 1.27 | 0.24 | 0.22 | 0.017 | 0.005 | 4.02 | 4.85 | 5.64 | 4.02 | 50 | 2.0 | 3.0 | 1.7 |
| 8 | 1.28 | 0.26 | 0.21 | 0.018 | 0.005 | 4.00 | 4.95 | 5.66 | 4.10 | 45 | 1.4 | 2.7 | 1.6 |
| 10 | 1.31 | 0.22 | 0.28 | 0.014 | 0.004 | 4.09 | 4.82 | 5.74 | 4.21 | 39 | 0.6 | 2.2 | 1.4 |

Figure 2:
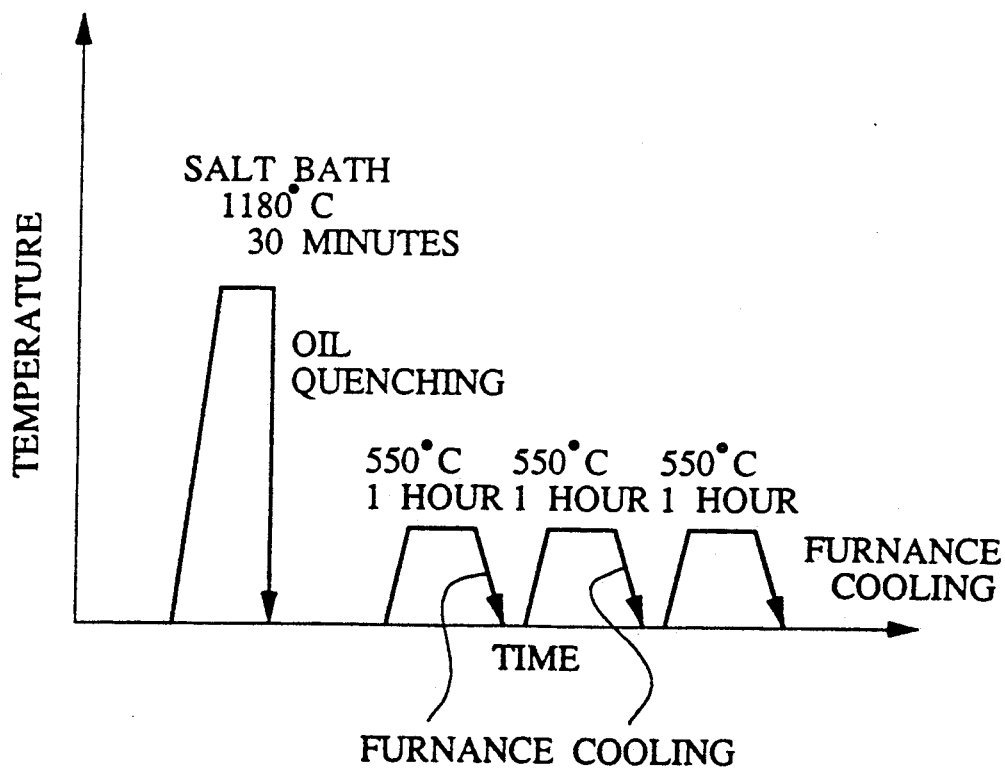
FIG. 2 is a view useful in explaining the manner of heat treatment of the steel bars made from the steel powders in Example 1.
Figure 3:
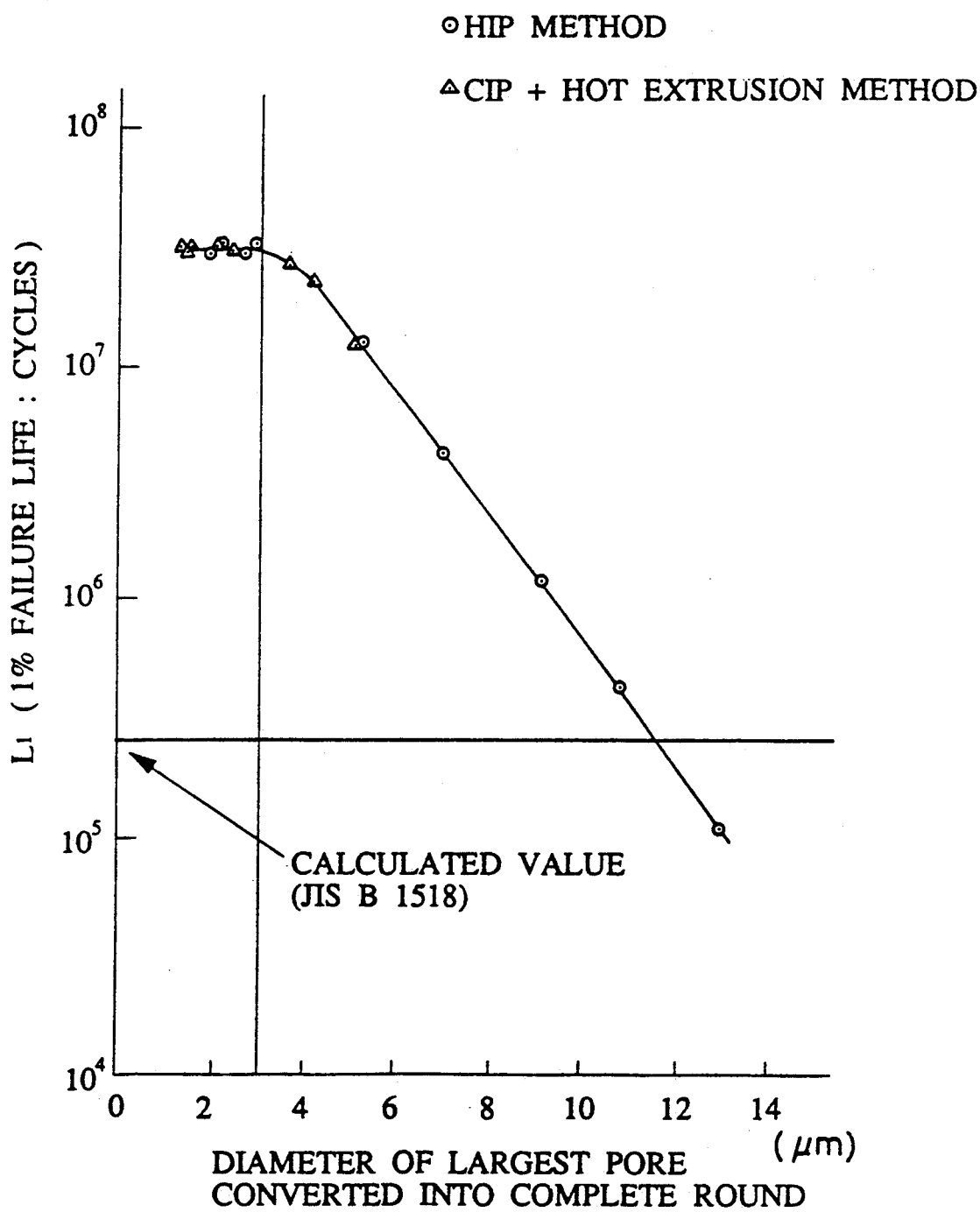
FIG. 3 is a view showing the relationship between $L_1$ (1% failure life), and the diameters of the largest pores, in Example 1.

A test piece in the form of a disc having a diameter of 60 mm and a thickness of 6 mm was prepared from each steel bar, and subjected to quench hardening and tempering by a heat treatment shown in FIG. 2. Further, the flat surfaces of the test piece was polished to obtain a test piece for a life test having an average surface roughness Ra of 0.01 μm or less. The test piece had hardness of 66.1 in terms of HRC. The diameter of the largest carbide existing in a test piece prepared from a steel bar produced by the HIP method was 5.4 μm, and the diameter of the largest carbide existing in a test piece prepared from a steel bar produced by the CIP+-hot extrusion method was 2.8 μm. These test pieces were subjected to a life test by the use of a testing machine described in "Tokushuko Binran (first edition)" compiled by Denki Seiko Kenkyusho, published by Rikogakusha, Tokyo, Japan, May 25, 1965, 10th to 21st sections. The testing conditions were as follows:

Maximum contact bearing pressure (Pmax): 578 kgf/mm²
Speed of rotation (N): 3000 cpm
Lubricating oil: VG 68 turbine oil The relationship between the 1% failure life (a time period elapsed before failure has occurred in 1% of population of test pieces) ($L_1$, hereinafter referred to as "life value") of each test piece obtained by the life test and the diameter of the largest pore is shown in FIG. 3. According to Japanese Industrial Standard (JIS) B 1518, the calculated value of the life value is $2.6 \times 10^5$ cycles. From FIG. 3, it can be understood that the life values of steel bars produced by both the sintering methods increase as the diameters of the largest pores existing in the steel bars are smaller. However, the life value is saturated when the diameters of the largest pores are equal to or smaller than 3 μm.

EXAMPLE 2

Figure 4:
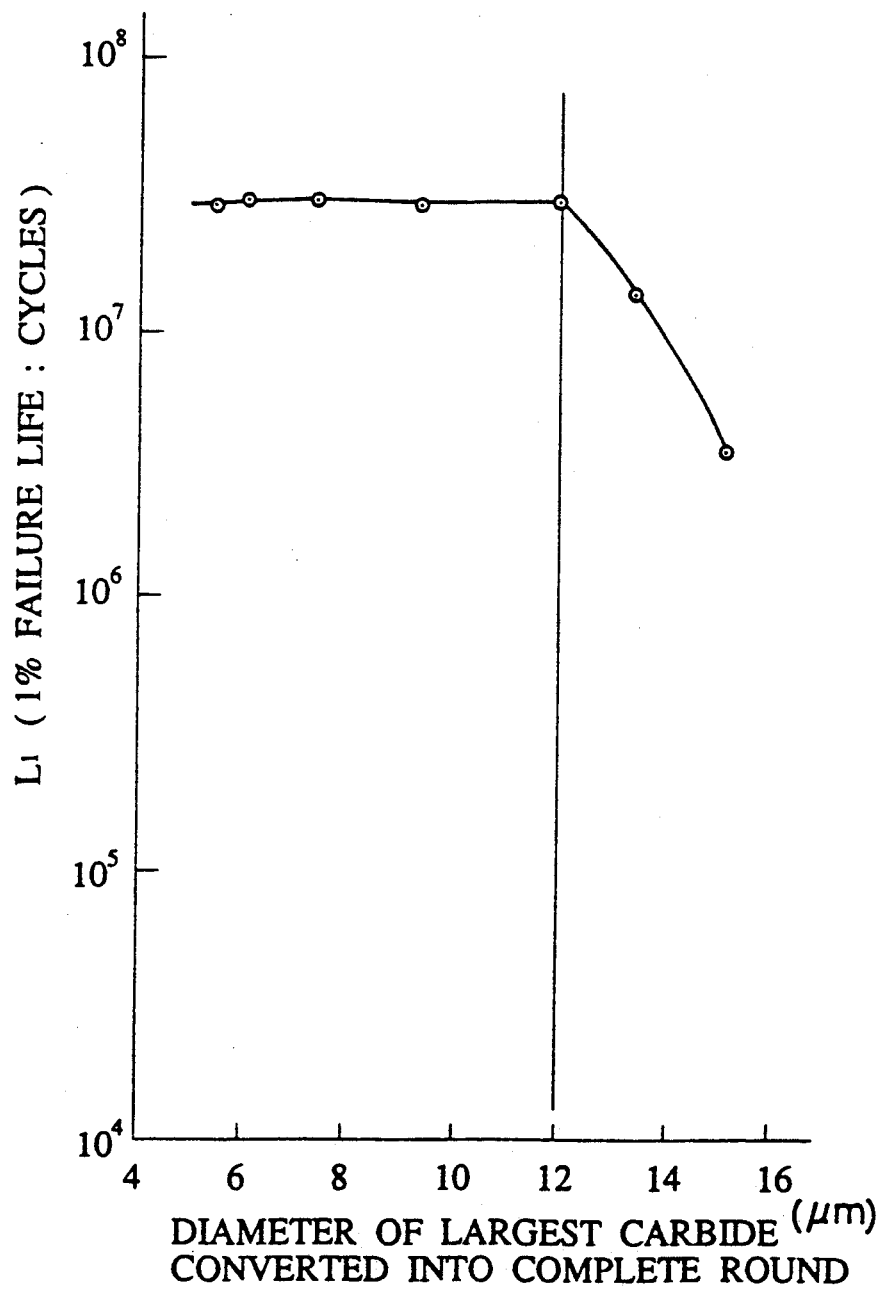
FIG. 4 is a view showing the relationship between $L_1$ (1% failure life), and the diameters of the largest carbides in terms of diameters assumed if the largest carbides were converted to spherical shapes (hereinafter merely referred to as "diameter(s) of the largest carbide(s)" unless otherwise specified), in Example 2.

The steel powder of Specimen No. 11 in Table 1 was sintered by the HIP method, at temperatures of 1100° C., 1120° C., 1140° C., 1160° C., 1180° C., 1190° C., and 1200° C. During the sintering by the HIP method, a powder of the steel powder obtained by sieving the steel powder to grain sizes smaller than 80 mesh (177 μm) was charged into a capsule made of soft steel. The capsule was welded with a cap having a degassing pipe. The capsule was heated up to 1150° C. while being evacuated via the degassing pipe by a rotary pump, and held under this condition for six hours. Then, the vacuum relief valve was closed, and the degassing pipe was squashed to be airtightly blocked up, and cut off, followed by being hermetically sealed by TIG welding. The capsules thus prepared were subjected to HIP treatment at the above-mentioned temperatures, respectively, under pressure of 1500 kgf/cm² for two hours. After the HIP treatment each steel ingot was rolled by a reduction ratio of approx. 10 into a steel bar having a diameter of 65 mm. Each sintered steel bar was cut into two pieces along an axis thereof and in parallel with the direction of rolling. After polishing a section of a resulting bar, the sizes and numbers of carbides and pores were examined by a microscope. The cut surface area subjected to examination was 3600 mm₂. Table 2 shows diameters of the largest carbides and the largest pores which exist in the steel bars prepared at the above-mentioned sintering temperatures. A test piece in the form of a disc having a diameter of 60 mm and a thickness of 6 mm was prepared from each steel bar, and subjected to quench hardening and tempering by the heat treatment shown in FIG. 2. Further, the flat surfaces of the test piece were polished to obtain a test piece for a life test having an average surface roughness Ra of 0.01 μm or less. Hardness values of the test pieces are shown in Table 3. These test pieces were subjected to a life test by the use of the testing machine described in "Tokushuko Binran (first edition) compiled by Denki Seiko Kenkyusho, published by Rikogakusha, Tokyo, Japan, May 25, 1965, 10th to 21st sections. The testing conditions were as follows:

Maximum contact bearing pressure (Pmax): 578 kgf/mm²
Speed of rotation (N): 3000 cpm
Lubricating oil: VG 68 turbine oil The relationship between the life value of each test piece obtained by the life test and the diameter of the largest carbide is shown in FIG. 4. As can be learned from the figure, as the diameters of the largest carbides are smaller, the life values are larger. However, the life value is saturated when the diameters are equal to or smaller than 12 μm.

TABLE 2

| SINTERING TEMPERATURE (°C.) | DIAMETER OF LARGEST CARBIDE CONVERTED INTO COMPLETE ROUND (μm) | DIAMETER OF LARGEST PORE CONVERTED INTO COMPLETE ROUND (μm) |
| --- | --- | --- |
| 1100 | 5.4 | 2.0 |
| 1120 | 6.0 | 2.1 |
| 1140 | 7.3 | 2.3 |
| 1160 | 9.2 | 2.3 |
| 1180 | 11.8 | 2.5 |
| 1190 | 13.3 | 2.7 |
| 1200 | 15.0 | 3.0 |

TABLE 3

| SINTERING TEMPERATURE (°C.) | HARDNESS HRC |
| --- | --- |
| 1100 | 66.1 |
| 1120 | 66.2 |
| 1140 | 66.2 |
| 1160 | 66.3 |
| 1180 | 66.4 |
| 1200 | 66.5 |

EXAMPLE 3

Figure 5:
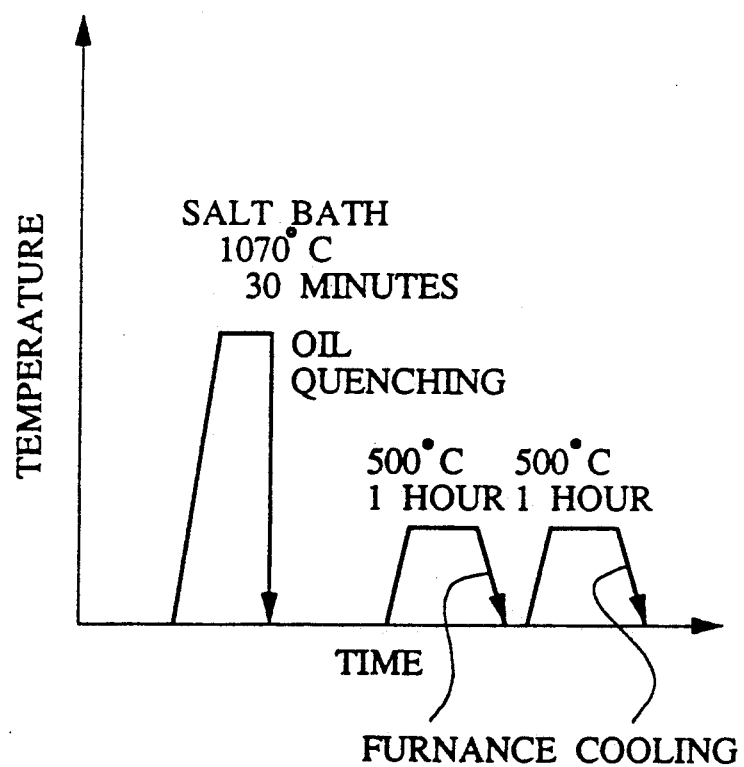
FIG. 5 is a view showing the manner of heat treatment of Specimen No. 15 in Example 3.
Figure 6:
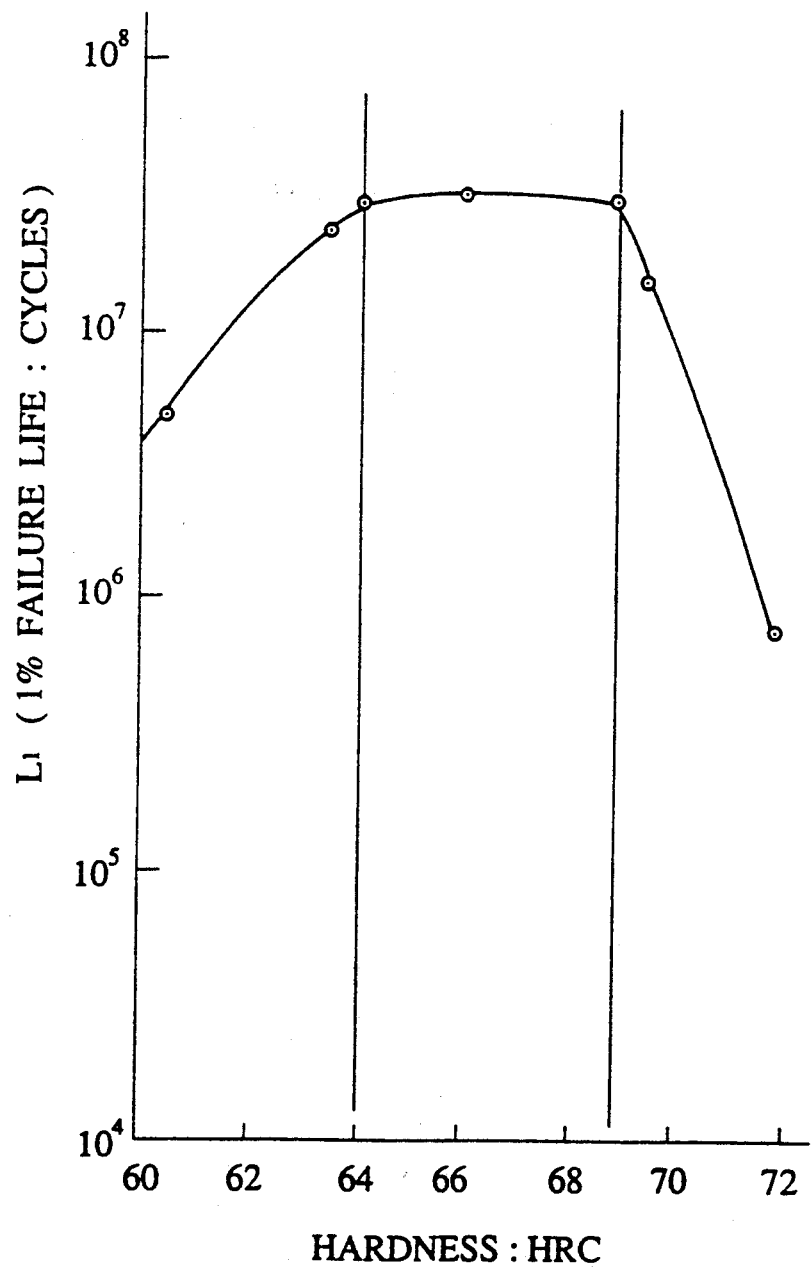
FIG. 6 is a view showing the relationship between $L_1$ (1% failure life) and hardness in Example 3.

From each of steel powders of Specimens Nos. 12 to 18 having respective chemical compositions shown in Table 4 was prepared a powder obtained by sieving the steel powder to grain sizes equal to or smaller than 80 mesh. The steel powder was charged into a capsule made of soft steel. The capsule was welded with a cap having a degassing pipe. The capsule was heated up to 1150° C. while being evacuated via the degassing pipe by a rotary pump, and held under this condition for six hours. Then the vacuum relief valve was closed, and the degassing pipe was squashed to be airtightly blocked up, and cut off, followed by hermetically sealed by TIG welding. The capsules thus prepared were to CIP treatment at a temperature of 30° C., and under pressure of 5000 kgf/cm² for ten minutes. Each of the resulting green compacts, which was heated up to 1100° C., and held under this condition for 10 minutes, was subjected to hot extrusion into a steel bar having a diameter of 65 mm. The ratio in cross-sectional area between before hot extrusion and after hot extrusion was 10 to 1. A test piece in the form of a disc having a diameter of 60 mm and a thickness of 6 mm was prepared from each steel bar. Test pieces prepared from steel powders of Specimens Nos. 12, 13, 14, 16, 17, and 18 were subjected to quench hardening and tempering by the heat treatment shown in FIG. 2, while a test piece prepared from a steel powder of Specimen No. 15 was subjected to quench hardening and tempering by a heat treatment shown in FIG. 5. Further, the flat surfaces of each of the test pieces were polished to obtain a test piece for a life test having an average surface roughness Ra of 0.01 μm or less. Hardness values of the test pieces are shown in Table 4. These test pieces were subjected to a life test by the use of the testing machine described in "Tokushuko Binran (first edition)" compiled by Denki Seiko Kenkyusho, published by Rikogakusha, Tokyo, Japan, May 25, 1965, 10th to 21st sections. The testing conditions were as follows:

Maximum contact bearing pressure (Pmax): 578 kgf/mm$^2$
Speed of rotation (N): 3000 cpm
Lubricating oil: VG 68 turbine oil The relationship between the life value of each test piece obtained by the life test and the hardness of same is shown in FIG. 6. As can be understood from the figure, when the hardness is in a region higher than 64 and lower than 69 in terms of HRC, the life values assume the maximum values.

up, and cut off, followed by being hermetically sealed by TIG welding. The capsules thus prepared were subjected to CIP treatment at a temperature of 30° C. and under pressure of 5000 kgf/cm$^2$ for ten minutes. Each of the resulting green compacts, which was heated up to 1100° C., and held under this condition for 10 minutes, was subjected to hot extrusion into a steel bar having a diameter of 65 mm. The ratio in cross-sectional area between before hot extrusion and after hot extrusion was 10 to 1. Each steel bar was roughly machined into inner and outer rings and rolling elements of a deep groove ball bearing according to JIS 6206. The inner and outer rings and the rolling elements were subjected to heat treatment at the temperatures over the time periods as shown in Table 5. After polishing, Bearings Nos. 1 to 9 were completed. Values of hardness of the inner and outer rings and the rolling elements, and (a value of hardness of the rolling elements—a value of hardness of the inner and outer rings), of each bearing are shown in Table 5. Each bearing was subjected to a life test by the use of a machine for testing the life of an

TABLE 4

| SPECI-MEN NO. | CHEMICAL COMPOSITION (%) | | | | | | | | | | O (ppm) | HARDNESS HRC |
|---|---|---|---|---|---|---|---|---|---|---|---|---|
| | C | Si | Mn | P | S | Cr | Mo | W | V | Co | | |
| 12 | 1.32 | 0.25 | 0.29 | 0.014 | 0.003 | 3.13 | 4.96 | 5.76 | 4.16 | — | 37 | 66.1 |
| 13 | 0.75 | 0.24 | 0.30 | 0.013 | 0.005 | 4.11 | 2.00 | — | 0.74 | — | 32 | 60.5 |
| 14 | 1.01 | 0.20 | 0.32 | 0.011 | 0.006 | 4.02 | 4.45 | — | 1.09 | — | 34 | 63.6 |
| 15 | 2.27 | 0.33 | 0.35 | 0.026 | 0.009 | 18.23 | 1.99 | — | 1.08 | — | 35 | 64.1 |
| 16 | 1.72 | 0.28 | 0.29 | 0.020 | 0.001 | 4.21 | 2.26 | 14.81 | 4.63 | 8.12 | 36 | 68.9 |
| 17 | 2.13 | 0.24 | 0.30 | 0.014 | 0.005 | 4.03 | 6.11 | 13.91 | 5.41 | 10.00 | 37 | 69.5 |
| 18 | 2.22 | 0.25 | 0.31 | 0.012 | 0.004 | 3.99 | 8.04 | 13.82 | 5.50 | 12.00 | 36 | 71.9 |

The relationship between the life value of each test piece obtained by the life test and the hardness of same is shown in FIG. 6. As can be understood from the figure, when the hardness is in a region higher than 64 and lower than 69 in terms of HRC, the life values assume the maximum values.

EXAMPLE 4

Figure 7:
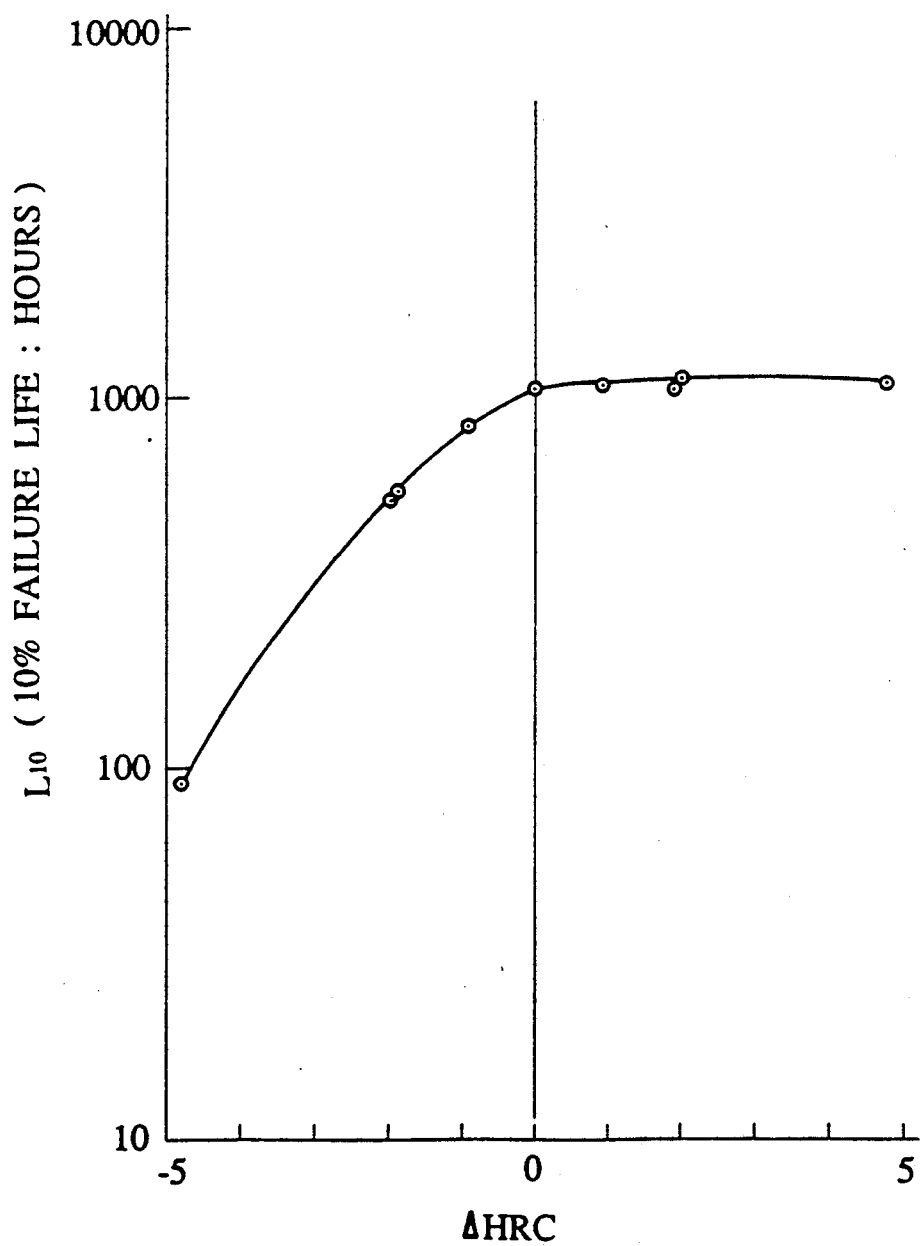
FIG. 7 is a view showing the relationship between $L_{10}$ (10% failure life) and $\Delta$HRC (hardness of a rolling element − hardness of inner and outer rings) in Example 4.

From each of steel powders of Specimens Nos. 12, 15 and 16 was prepared a powder obtained by sieving the steel powder to grain sizes equal to or smaller than 80 mesh. The steel powder was charged into a capsule made of soft steel. The capsule was welded with a cap having a degassing pipe. The capsule was heated up to 1150° C. while being evacuated via the degassing pipe by a rotary pump, and held under this condition for six hours. Then the vacuum relief valve was closed, and the degassing pipe was squashed to be airtightly blocked oil bath lubrication type bearing described in "Technical Journal" compiled by Nippon Seiko Kabushiki Kaisha, No. 646, Section 20. The testing conditions were as follows:

Radial load Fr: 1410 kgf
Maximum contact bearing pressure (Pmax): 350 Kgf/mm$^2$
Lubricating oil: VG 68 turbine oil
Speed of rotation (with inner ring rotating while outer ring stationary): 3000 rpm The results of the life test are shown in FIG. 7. Here, the ordinate $L_{10}$ indicates the 10% failure life i.e. a time period elapsed before flaking occurred in any of the inner and outer rings and the rolling elements of 10% of population of the bearings. From the figure, when ΔHRC (a value of hardness of a rolling element—a value of hardness of inner and outer rings) assumes negative values, the life value becomes lower.

TABLE 5

| BEARING NO. | PART | SPECIMEN NO. | HEAT TREATMENT | | HARDNESS HRC | DIFFERENCE IN HARDNESS BETWEEN ROLLING ELEMENT, AND INNER AND OUTER RINGS |
|---|---|---|---|---|---|---|
| | | | QUENCHING TEMP. (°C.) × DURATION (MINUTES) | TEMPERING TEMP. (°C.) × DURATION (HOURS) × NUMBER OF TIMES | | |
| 1 | ROLLING ELEMENT | 12 | 1180 × 30 | 550 × 1 × 3 | 66.1 | 0 |
| | INNER AND OUTER RINGS | 12 | 1180 × 30 | 550 × 1 × 3 | 66.1 | |
| 2 | ROLLING ELEMENT | 12 | 1200 × 30 | 550 × 1 × 3 | 67.0 | 0.9 |
| | INNER AND OUTER RINGS | 12 | 1180 × 30 | 550 × 1 × 3 | 66.1 | |
| 3 | ROLLING ELEMENT | 12 | 1180 × 30 | 550 × 1 × 3 | 66.1 | −0.9 |
| | INNER AND OUTER RINGS | 12 | 1200 × 33 | 550 × 1 × 3 | 67.0 | |
| 4 | ROLLING | 15 | 1070 × 30 | 500 × 1 × 2 | 64.1 | −4.8 |

TABLE 5-continued

| BEARING NO. | PART | SPECIMEN NO. | HEAT TREATMENT | | HARDNESS HRC | DIFFERENCE IN HARDNESS BETWEEN ROLLING ELEMENT, AND INNER AND OUTER RINGS |
|---|---|---|---|---|---|---|
| | | | QUENCHING TEMP. (°C.) × DURATION (MINUTES) | TEMPERING TEMP. (°C.) × DURATION (HOURS) × NUMBER OF TIMES | | |
| | INNER AND OUTER RINGS | 16 | 1180 × 30 | 550 × 1 × 3 | 68.9 | |
| 5 | ROLLING ELEMENT | 16 | 1180 × 30 | 550 × 1 × 3 | 68.9 | 4.8 |
| | INNER AND OUTER RINGS | 15 | 1070 × 30 | 500 × 1 × 2 | 64.1 | |
| 6 | ROLLING ELEMENT | 12 | 1200 × 30 | 550 × 1 × 3 | 67.0 | −1.9 |
| | INNER AND OUTER RINGS | 16 | 1180 × 30 | 550 × 1 × 3 | 68.9 | |
| 7 | ROLLING ELEMENT | 16 | 1180 × 30 | 550 × 1 × 3 | 68.9 | 1.9 |
| | INNER AND OUTER RINGS | 12 | 1200 × 30 | 550 × 1 × 3 | 67.0 | |
| 8 | ROLLING ELEMENT | 12 | 1180 × 30 | 550 × 1 × 3 | 66.1 | 2.0 |
| | INNER AND OUTER RINGS | 15 | 1070 × 30 | 500 × 1 × 2 | 64.1 | |
| 9 | ROLLING ELEMENT | 15 | 1070 × 30 | 500 × 1 × 2 | 64.1 | −2.0 |
| | INNER AND OUTER RINGS | 12 | 1180 × 30 | 550 × 1 × 3 | 66.1 | |

In addition, all the portions of Bearings Nos. 1 to 9 exhibit austenite concentration of not higher than 5%, and have been subjected to high temperature tempering a plurality of times, so that they have dimensional stability more than 3 times as excellent as conventional bearings made of SUJ 2 (obtained by quench hardening carried out at temperatures of 820° to 860° C., and tempering carried out at temperatures of 160° to 200° C.). As a result, even if they are used at high temperatures of 120° to 200° C., there is no change in the fit between the component parts. Further, Bearings Nos. 1, 2, 5, 7, and 8 have long lives. The sintered alloy steels used for the bearings in this example have a large number of very small carbides dispersed therein, and therefore, they are suitable for bearings having portions thereof required to have excellent wear resistance, such as surfaces of guide ribs of roller bearings. Furthermore, since the bearings according to this example are very hard, no impression can be produced even if they are used in lubricating oil containing foreign matters such as iron powder, and hence they have long lives.

EXAMPLE 5

From the steel powder of Specimen No. 12 was prepared a powder obtained by sieving the steel powder to grain sizes equal to or smaller than 80 mesh. The resulting steel powder was charged into capsules made of soft steel and having various sizes. Each of the capsules was welded with a cap having a degassing pipe. The capsule was heated up to 1150° C. while being evacuated via the degassing pipe by a rotary pump, and held under this condition for six hours. Then the vacuum relief valve was closed, and the degassing pipe was squashed to be airtightly blocked up, and cut off, followed by being hermetically sealed by TIG welding. The capsules thus prepared were subjected to CIP treatment at a temperature of 30° C. and under pressure of 5000 kgf/cm² for ten minutes. Each of the resulting green compacts, which was heated up to 1100° C., and held under this condition for 10 minutes, was subjected to hot extrusion into a steel bar having a diameter of 65 mm. The ratio in cross-sectional area between before hot extrusion and after hot extrusion was 10 to 1–5 to 1. Each steel bar was roughly machined by cutting into inner and outer rings and rolling elements of a deep groove ball bearing according to JIS 6206. The inner and outer rings and the rolling elements were subjected to heat treatment at the temperatures over the time periods as in the case of Bearing No. 1 shown in Table 5. After polishing, bearings were completed. Each bearing was subjected to a life test by the use of a machine for testing the life of an oil bath lubrication type bearing described in "Technical Journal" compiled by Nippon Seiko Kabushiki Kaisha, No. 646, Section 20. The testing conditions were as follows:

Radial load Fr: 1410 kgf

Maximum contact bearing pressure (Pmax): 350 kgf/mm²

Lubricating oil: VG 68 turbine oil

Figure 8:
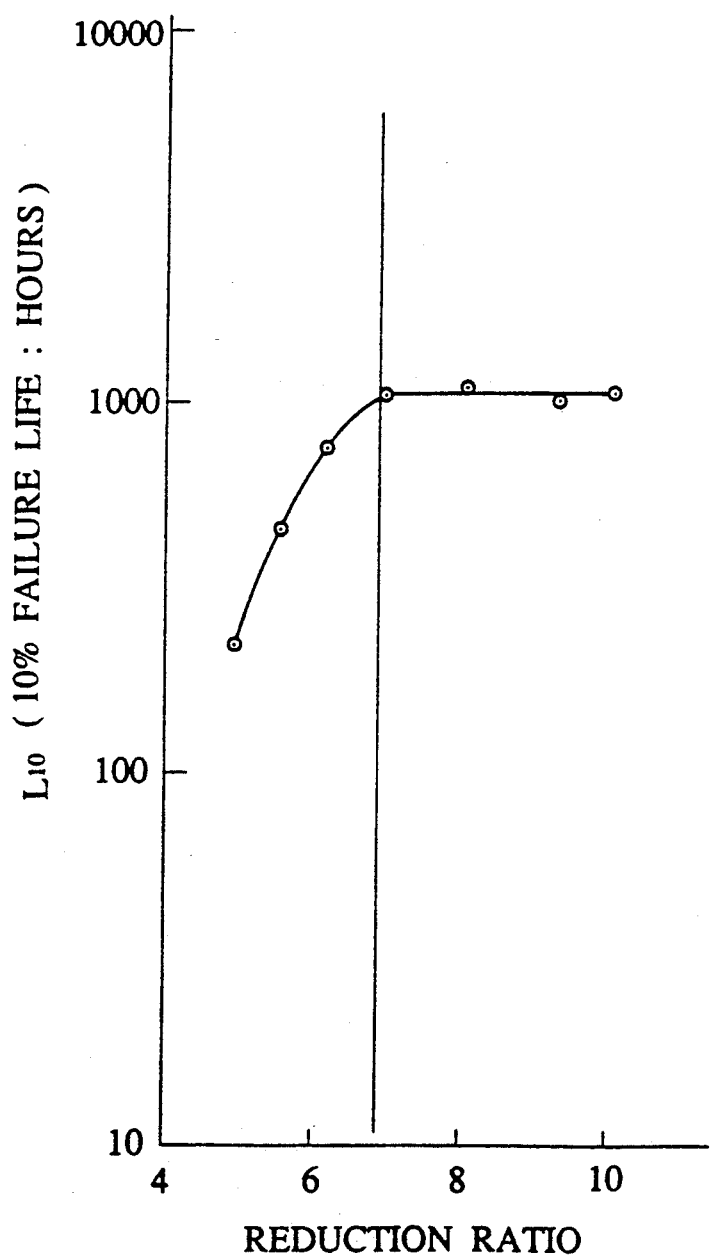
FIG. 8 is a view showing the relationship between $L_{10}$ (10% failure life) and reduction ratio in Example 5.

Speed of rotation (with inner ring rotating while outer ring stationary): 3000 rpm The results of the life test are shown in FIG. 8. Here, the ordinate $L_{10}$ indicates the aforementioned 10% failure life. From the figure, it can be understood that when the ratio in cross-sectional area between before hot extrusion and after hot extrusion i.e. the reduction ratio becomes smaller than 7, the life of bearings becomes shorter. In addition, in the bearing produced from a steel bar by a reduction ratio of 5 as well, the diameter of the largest carbide is 2.8 μm, and it goes without saying that all the bearings in FIG. 8 satisfy the conditions recited in claims 1 and 2 appended hereto.

What is claimed is:

1. A rolling bearing comprising inner and outer rings, and rolling elements, at least one of said inner and outer rings and said rolling elements being formed of a sintered alloy steel, said at least one of said inner and outer rings and said rolling elements having pores and carbides present therein, the largest one of said pores having a diameter equal to or smaller than 3 μm in terms of a diameter assumed if said largest pore were converted to a spherical shape, the largest one of said carbides having a diameter equal to or smaller than 12 μm in terms of a diameter assumed if said largest carbide were converted to a spherical shape, said at least one of said inner and outer rings and said rolling elements having hardness higher than 64 and lower than 69 in terms of HRC.

2. A rolling bearing according to claim 1, wherein said rolling elements have hardness higher than that of said inner and outer rings.

3. A rolling bearing according to claim 1, wherein said sintered alloy steel is manufactured by rolling a sintered body by a reduction ratio of not smaller than 7.

4. A rolling bearing according to claim 1, wherein said sintered alloy steel is manufactured from an alloy powder by a cold isostatic pressing+hot extrusion method.

5. A rolling bearing according to claim 2, wherein said sintered alloy steel is manufactured by rolling a sintered body by a reduction ratio of not smaller than 7.

6. A rolling bearing according to claim 2, wherein said sintered alloy steel is manufactured from an alloy powder by a cold isostatic pressing+hot extrusion method.

* * * * *

UNITED STATES PATENT AND TRADEMARK OFFICE
CERTIFICATE OF CORRECTION

PATENT NO. : 5,108,491

DATED : April 28, 1992

INVENTOR(S) : MATSUMOTO et al

It is certified that error appears in the above-identified patent and that said Letters Patent is hereby corrected as shown below:

Title page, Section [56] References Cited, right column, insert the following:

--FOREIGN PATENT DOCUMENTS

```
613,275    11/1948 Great Britain
60-67644    4/1985 Japan
61-19756    1/1986 Japan--.
```

Abstract, line 7, replace "assued" with --assumed--.

Signed and Sealed this

Twenty-first Day of September, 1993

*Attest:*

BRUCE LEHMAN

*Attesting Officer*  *Commissioner of Patents and Trademarks*